(12) United States Patent
Yoshimi

(10) Patent No.: US 10,911,620 B2
(45) Date of Patent: Feb. 2, 2021

(54) DISPLAY CONTROL APPARATUS FOR DISPLAYING FIRST MENU ITEMS AND SECOND LOWER LEVEL MENU ITEMS BASED ON TOUCH AND TOUCH-RELEASE OPERATIONS, AND CONTROL METHOD THEREOF

(71) Applicant: CANON KABUSHIKI KAISHA, Tokyo (JP)

(72) Inventor: Takashi Yoshimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/600,181

(22) Filed: Oct. 11, 2019

(65) Prior Publication Data

US 2020/0112647 A1 Apr. 9, 2020

Related U.S. Application Data

(63) Continuation of application No. 15/610,397, filed on May 31, 2017, now Pat. No. 10,447,872, which is a (Continued)

(30) Foreign Application Priority Data

Sep. 14, 2012 (JP) .................................. 2012-203007

(51) Int. Cl.
*H04N 1/00* (2006.01)
*H04N 5/232* (2006.01)
(Continued)

(52) U.S. Cl.
CPC ......... *H04N 1/00411* (2013.01); *G06F 3/048* (2013.01); *G06F 3/0482* (2013.01);
(Continued)

(58) Field of Classification Search
CPC ......... H04N 5/23293; H04N 5/232933; H04N 5/232935; H04N 5/232939;
(Continued)

(56) References Cited

U.S. PATENT DOCUMENTS

| | | | |
|---|---|---|---|
| 2002/0063738 A1* | 5/2002 | Chung ................... | G06F 3/0482 715/810 |
| 2009/0070711 A1* | 3/2009 | Kwak .................... | G06F 3/0488 715/829 |

(Continued)

*Primary Examiner* — Twyler L Haskins
*Assistant Examiner* — Akshay Trehan
(74) *Attorney, Agent, or Firm* — Canon U.S.A., Inc. I.P. Division

(57) ABSTRACT

A display control apparatus enables a user to easily recognize that a selectable item is present in addition to a displayed item and to recognize without being confused that a target item has been touched. The apparatus is capable of displaying an item group including a plurality of items which are a part of all items, when a touch is detected on any item in the item group displayed on the display unit, displaying the touched item in a selected state, and if release of the touch is detected, and if the selected item is an end item among the displayed group of items but is not an end item among all the items, moving the displayed item among all the items in a direction for displaying an item that is not being displayed in the direction of an end based on the release of the touch.

7 Claims, 9 Drawing Sheets

Related U.S. Application Data continuation of application No. 14/024,327, filed on Sep. 11, 2013, now Pat. No. 9,699,334.

(51) Int. Cl.
*G06F 3/048* (2013.01)
*G06F 3/0482* (2013.01)
*G06F 3/041* (2006.01)
*G06F 3/0488* (2013.01)

(52) U.S. Cl.
CPC ..... *H04N 1/00408* (2013.01); *H04N 1/00413* (2013.01); *H04N 1/00416* (2013.01); *H04N 5/23216* (2013.01); *H04N 5/23293* (2013.01); *H04N 5/232933* (2018.08); *G06F 3/0416* (2013.01); *G06F 3/0488* (2013.01)

(58) Field of Classification Search
CPC ........... H04N 5/23296; H04N 5/23299; H04N 5/23216; H04N 1/00408; H04N 1/00411; H04N 1/00416; G06F 3/0416; G06F 3/0482; G06F 3/0488; G06F 1/1692
USPC .............. 348/231.6, 333.01, 333.02, 333.11, 348/333.12, 345, 349; 345/173
See application file for complete search history.

(56) References Cited

U.S. PATENT DOCUMENTS

| | | | |
|---|---|---|---|
| 2010/0281374 A1* | 11/2010 | Schulz | G06F 3/0482 715/723 |
| 2011/0010659 A1* | 1/2011 | Kim | G06F 3/04817 715/784 |
| 2011/0057957 A1* | 3/2011 | Kasahara | G06F 3/04886 345/684 |
| 2011/0083105 A1* | 4/2011 | Shin | G06F 3/0485 715/830 |
| 2011/0093812 A1* | 4/2011 | Fong | G06F 3/0485 715/810 |
| 2011/0115728 A1* | 5/2011 | Kwak | G06F 3/0488 345/173 |
| 2012/0274796 A1* | 11/2012 | Choi | H04N 5/232 348/220.1 |
| 2013/0067392 A1* | 3/2013 | Leonard | G06F 3/0486 715/784 |

* cited by examiner

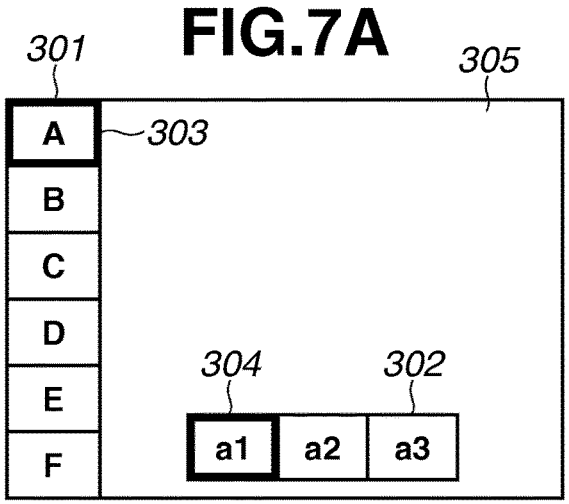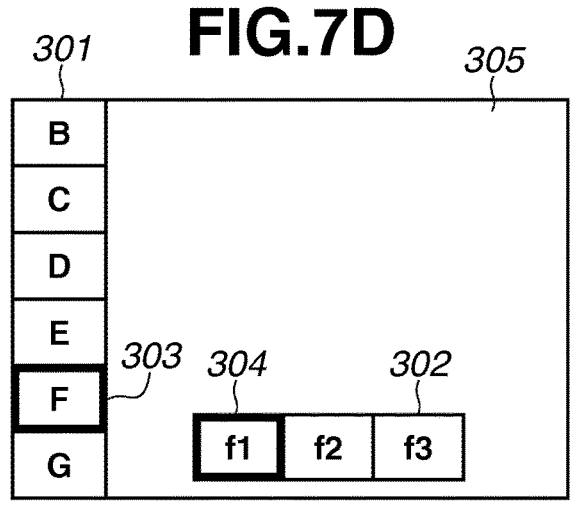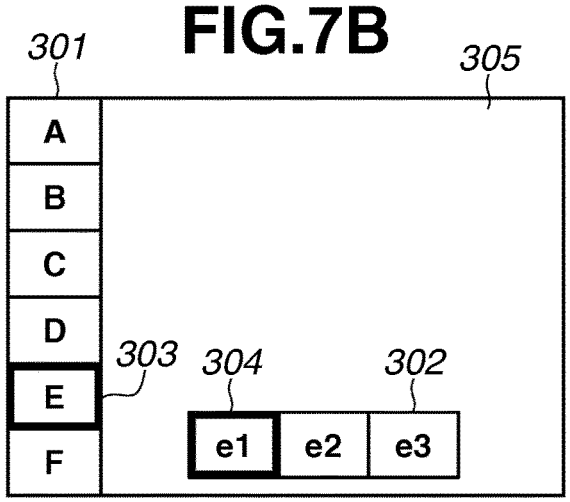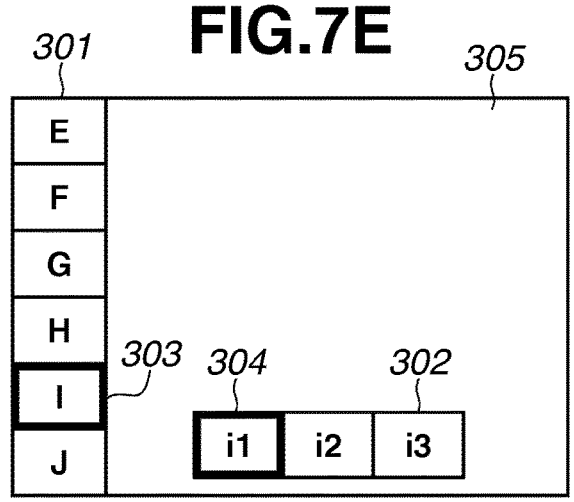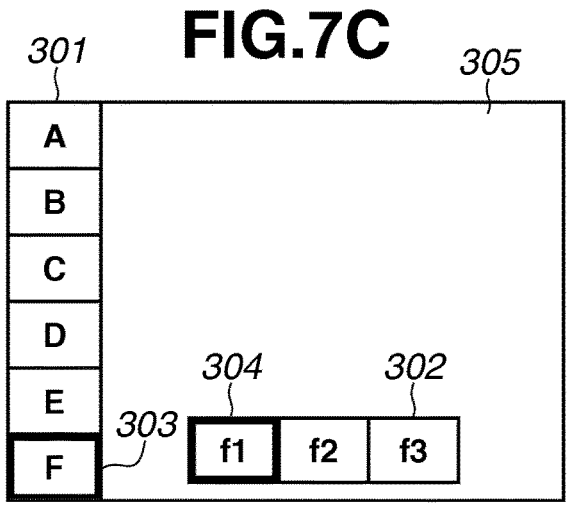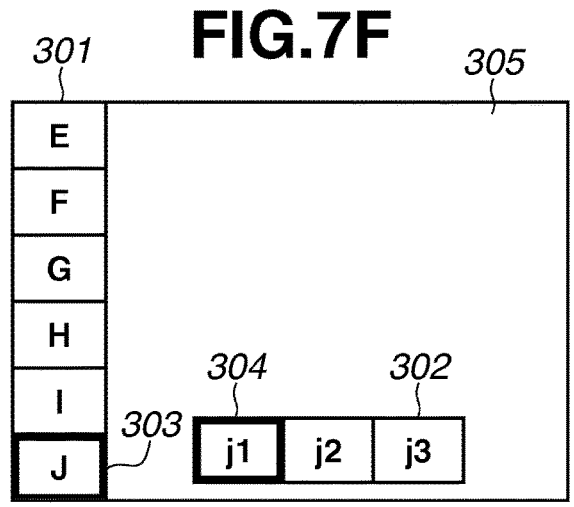

DISPLAY CONTROL APPARATUS FOR DISPLAYING FIRST MENU ITEMS AND SECOND LOWER LEVEL MENU ITEMS BASED ON TOUCH AND TOUCH-RELEASE OPERATIONS, AND CONTROL METHOD THEREOF

CROSS-REFERENCE TO RELATED APPLICATIONS

This application is a continuation, and claims the benefit, of U.S. application Ser. No. 15/610,397, filed on May 31, 2017 (and having a projected patent number of U.S. Pat. No. 10,447,872 and a projected issue date of Oct. 15, 2019), which is a continuation and claims the benefit of U.S. application Ser. No. 14/024,327, filed on Sep. 11, 2013 (now U.S. Pat. No. 9,699,334), which claims priority to Japanese Patent Application No. 2012-203007, filed Sep. 14, 2012, each of which is hereby incorporated by reference herein in their entirety.

BACKGROUND OF THE INVENTION

Field of the Invention

The present disclosure generally relates to display control and, more particularly, to a display control apparatus that can select any one of a plurality of displayed items by a touch operation and a method for controlling the display control apparatus.

Description of the Related Art

Conventionally, on a function setting menu screen in an electronic device, for example, a part of a plurality of selectable items is displayed on one screen, and items that cannot be displayed within the screen are displayed by scrolling.

Japanese Patent Application Laid-Open No. 2011-039602 discusses a technique for scrolling by one item when a user selects a menu item that is at an end of the displayed portion from among a series of items including a plurality of menu items, and making a user recognize the fact that selectable menu items also exist further on.

Japanese Patent Application Laid-Open No. 2011-159134 discusses a technique in which a plurality of selectable images is displayed on one screen on which a user can select a desired image by touching the screen. This screen is scrolled in response to the movement of the finger touching on the screen, and another plurality of images is displayed.

In a case like Japanese Patent Application Laid-Open No. 2011-159134, in which a plurality of selectable items (in Japanese Patent Application Laid-Open No. 2011-159134, images) can be selected by a touch operation on a touch panel, in order to show the user that the touch operation on the desired item has been received, when one of the items is touched, it is desirable to display the touched item in a selected state at the time when the touch operation is made. On the other hand, if an end item is selected from among the displayed items, and if selectable items are present further on from the end item, like in Japanese Patent Application Laid-Open No. 2011-039602, it is easier to understand that there are more selectable items further on by scrolling to indicate the presence of the items further on.

However, in a case that a touch is made on an item that is an end item among the displayed items and selectable items are present further on from the touched item, if the touched item is displayed in a selected state at the point when the touch was made like in Japanese Patent Application Laid-Open No. 2011-159134, and scrolling is performed like in Japanese Patent Application Laid-Open No. 2011-039602, there is the following problem. The item displayed in the selected state at the position of the touching finger is moved due to the scrolling, so that the position of the touching finger and the position of the selected item are deviated from each other. Consequently, the user may be confused that the item at the position touched by his/her finger is not correctly selected.

SUMMARY OF THE INVENTION

The present disclosure is directed to, on a screen on which a plurality of item is displayed, a display control apparatus enabling a user to easily recognize the fact that a selectable item is present in addition to the displayed items and recognize that a target item has been touched without being confused.

According to an aspect of the present disclosure, a display control apparatus includes a display control unit configured to control a display unit to display an item group including a plurality of items which are a part of all items on a specific screen, a detection unit configured to detect a touch operation on the display unit, and a control unit configured to perform control to, in a case where a touch is detected on any item in the item group displayed on the display unit among all the items, display the touched item in a selected state, and in a case where release of the touch is detected, and the selected item is an end item among the item group displayed on the display unit but is not an end item among all the items, move a displayed item in a direction for displaying an item that is not being displayed in a direction to an end in response to the release of the touch.

According to the present disclosure, on a screen on which a plurality of item is displayed by a touch operation, the fact that a selectable item is present in addition to displayed items can be easily recognized, and a user can recognize that a target item has been touched without being confused.

Further features of the present disclosure will become apparent from the following description of exemplary embodiments with reference to the attached drawings.

BRIEF DESCRIPTION OF THE DRAWINGS

FIGS. 7A to 7F are display examples on a FUNC menu.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1:
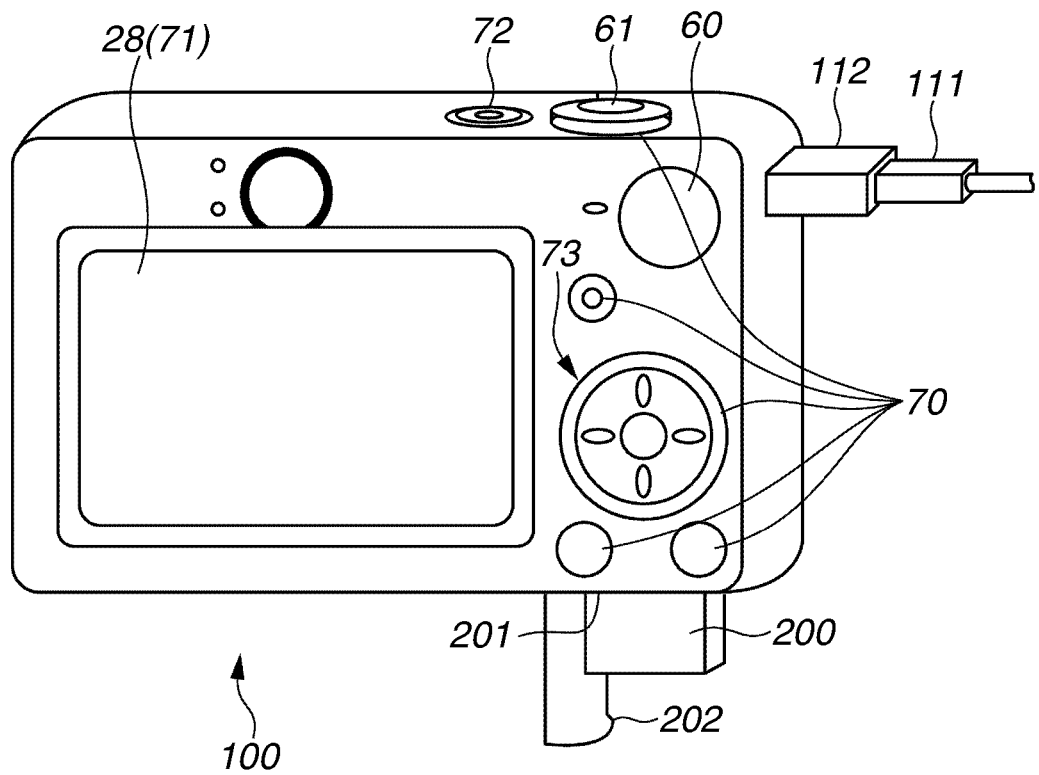
FIG. 1 is an external view of a digital camera according to an exemplary embodiment of the present disclosure.

FIG. 1 illustrates an external view of a digital camera as an example of a display control apparatus according to an exemplary embodiment of the present disclosure. A display unit 28 displays images and various information pieces. A shutter button 61 is an operation unit for issuing imaging instructions. A mode changing switch 60 is an operation unit for switching among various modes. A connector 112 is a connector between a connection cable 111 and a digital camera 100. An operation unit 70 includes operation members, such as various switches, buttons, and a touch panel, for receiving various operations from a user. A controller wheel 73 which is included in the operation unit 70 is a rotatable operation member. A power switch 72 switches the power on and off. A recording medium 200 is a memory card, a hard disk or the like. A recording medium slot 201 is a slot for storing the recording medium 200. The recording medium 200 stored in the recording medium slot 201 can communicate with the digital camera 100. A cover 202 is a cover for the recording medium slot 201. As used herein, the term "unit" generally refers to any combination of software, firmware, hardware, or other component that is used to effectuate a purpose.

Figure 2:
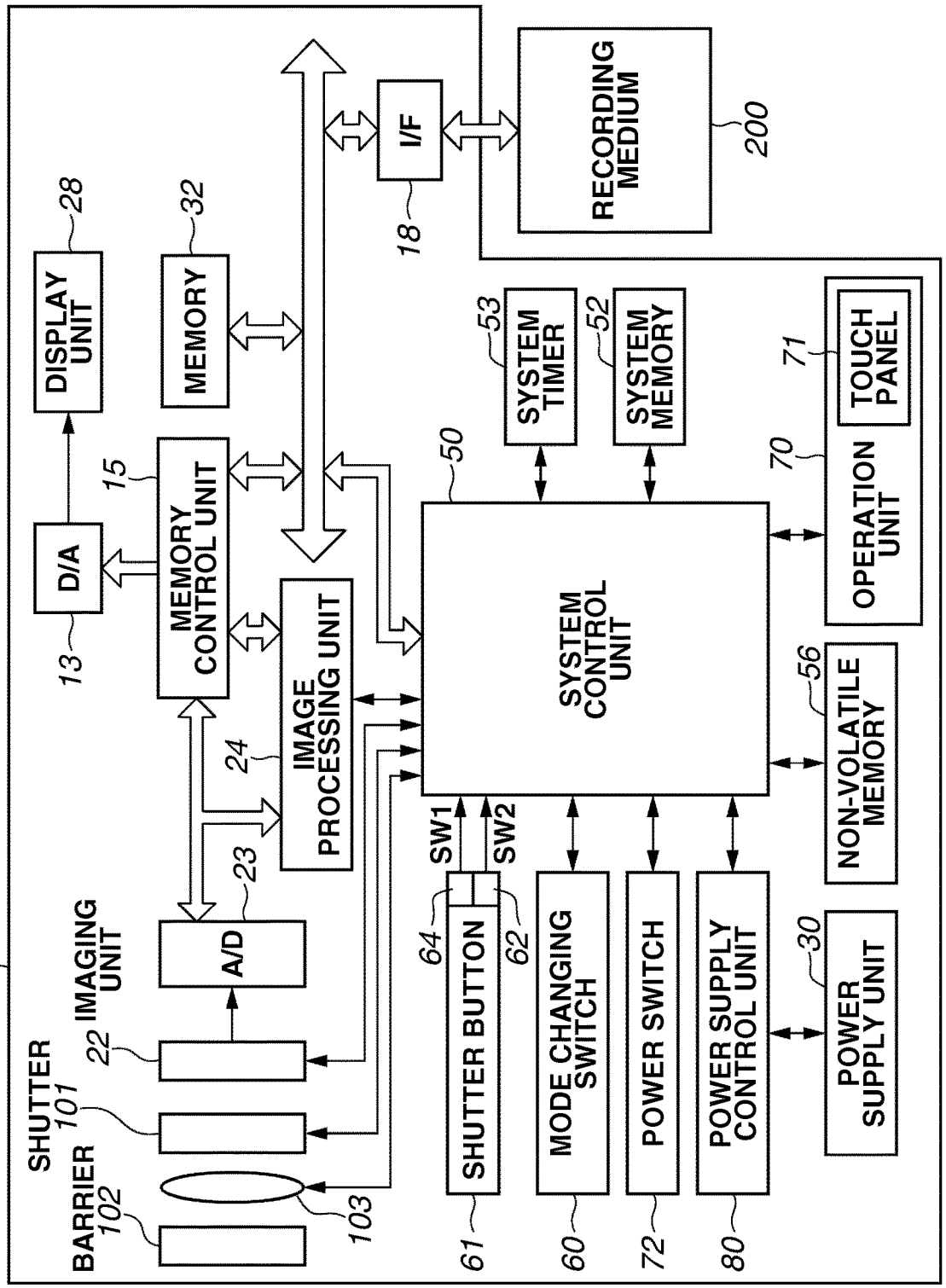
FIG. 2 is a block diagram illustrating a configuration of a digital camera according to an exemplary embodiment of the present disclosure.

FIG. 2 is a block diagram illustrating a configuration example of the digital camera 100 according to the present exemplary embodiment.

In FIG. 2, an imaging lens 103 is a lens group that includes a zoom lens and a focus lens. A shutter 101 has a diaphragm function. An imaging unit 22 is an image sensor that is configured from a charge-coupled device (CCD) or a complementary metal oxide semiconductor (CMOS) that converts an optical image into an electric signal. An analog/digital (A/D) converter 23 converts analog signals into digital signals. The A/D converter 23 is used to convert analog signals output from the imaging unit 22 into digital signals. A barrier 102 covers an imaging system, which includes the imaging lens 103, the shutter 101, and the imaging unit 22, of the digital camera 100 to prevent the imaging system from dirt and damage.

An image processing unit 24 performs predetermined pixel interpolation, resizing processing such as reduction, and color conversion processing on data from the A/D converter 23 or data from a memory control unit 15. In addition, the image processing unit 24 performs predetermined calculation processing using captured image data. Based on the obtained calculation result, a system control unit 50 performs exposure control and range-finding control. Consequently, through-the-lens (TTL) type autofocus (AF) processing, auto-exposure (AE) processing, and pre-flash (EF) processing are performed. Further, the image processing unit 24 performs predetermined calculation processing using captured image data, and performs TTL type auto white balance (AWB) processing based on the obtained calculation result.

Output data from the A/D converter 23 is directly written into a memory 32 via the image processing unit 24 and the memory control unit 15, or via the memory control unit 15. The memory 32 stores image data obtained by the imaging unit 22 and converted into digital data by the A/D converter 23, and image data for display on the display unit 28. The memory 32 includes a sufficient storage capacity to store a predetermined number of still images, and moving images and audio for a predetermined time length.

The memory 32 also has a function as a memory (video memory) for image display. A digital/analog (D/A) converter 13 converts data for image display stored in the memory 32 into an analog signal, and supplies the converted analog signal to the display unit 28. Consequently, the image data for display written in the memory 32 is displayed by the display unit 28 via the D/A converter 13. The display unit 28 performs display based on the analog signal from the D/A converter 13 on a display device, such as a liquid crystal display (LCD). Digital signals that have been subjected to A/D conversion by the A/D converter 23 and stored in the memory 32 are converted into analog signals by the D/A converter 13, and successively transferred and displayed on the display unit 28. Consequently, the display unit 28 displays a through-the-lens image by functioning as an electronic view finder.

A non-volatile memory 56 is an electronically erasable/recordable memory. The non-volatile memory 56 may be, for example, an electrically erasable programmable read-only memory (EEPROM). In the nonvolatile memory 56, constants and programs for operations of the system control unit 50 are stored. Such programs are programs for executing processing in various flowcharts described below according to the present exemplary embodiment.

The system control unit 50 controls the entire digital camera 100. The system control unit 50 realizes each of the below-described processes of the present exemplary embodiment by executing the programs recorded in the non-volatile memory 56. A random-access memory (RAM) is used as a system memory 52. In the system memory 52, constants and variables for operations of the system control unit 50, and programs read from the non-volatile memory 56 are developed. The system control unit 50 also performs display control by controlling the memory 32, the D/A converter 13, and the display unit 28.

A system timer 53 is a time measurement unit that measures the time for various controls and the time of a built-in clock.

The mode changing switch 60, a first shutter switch 62, a second shutter switch 64, and the operation unit 70 are operation units for inputting various operation instructions to the system control unit 50.

The mode changing switch 60 can switch an operation mode of the system control unit 50 to another mode, such as a still image recording mode, a moving image mode, and a reproduction mode. Examples of the modes included in the still image recording mode are an auto image-capturing mode, an auto scene determination mode, a manual mode, various scene modes that are imaging settings for different imaging scenes, a program AE mode, a custom mode, and so on. The mode changing switch 60 allows the user to directly switch the operation mode to any of the modes included in the still image recording mode. Alternatively, the user may set the mode changing switch 60 to the still image recording mode, and then switch the operation mode to another mode included in the still image recording mode using another operation member. Similarly, the moving image recording mode may also include a plurality of modes. The first shutter switch 62 is turned ON when the shutter button 61 provided on the digital camera 100 is half-pressed (an instruction to prepare for image capturing), and a first shutter switch signal SW1 is generated. Based on the first shutter switch signal SW1, operations such as AF processing, AE processing, AWB processing, and pre-flash (EF) processing start.

The second shutter switch 64 is turned ON when an operation of the shutter button 61 is completed, i.e., fully pressed (an imaging instruction), and a second shutter switch signal SW2 is generated. Based on the second shutter switch signal SW2, the system control unit 50 starts a series of imaging operations, from the reading of a signal from the imaging unit 22 to the writing of image data in the recording medium 200.

The various operation members included in the operation unit 70 are suitably assigned with a function for each situation based on a selection operation of various function icons displayed on the screen of the display unit 28. Consequently, these various operation members serve as the various function buttons. Examples of the function buttons include an end button, a return button, an image advancing button, a jump button, a narrow button, an attribute change button, and the like. For example, when a menu button is pressed, the display unit 28 displays a menu screen on which various settings can be performed. The user can intuitively perform various settings using the menu screen displayed on the display unit 28, four (up, down, left, and right) direction buttons, and a SET button. Among the four (up, down, left, and right) direction buttons, the up button and the down button will be collectively referred to as up/down buttons, and the left button and the right button will be collectively referred to as left/right buttons. When a FUNC button included in the operation unit 70 is pressed, the FUNC menu screen is superimposed over a through-the-lens image and allows the user to perform settings such as exposure and a self-timer setting.

The controller wheel 73 which is a rotatable operation member included in the operation unit 70 is used for indicating a selection item along with a direction button.

A power supply control unit 80 is configured from a battery detection circuit, a direct current-direct current (DC-DC) converter, a switching circuit for switching blocks to which power is supplied and the like. The power supply control unit 80 detects whether a battery is mounted or not, a type of the battery, and a remaining battery level. Based on the detection results and an instruction from the system control unit 50, the power supply control unit 80 controls the DC-DC converter and supplies a required voltage to the various parts, including the recording medium 200, for a required period of time.

A power supply unit 30 is configured from, for example, a primary battery, such as an alkali or a lithium battery, a secondary battery, such as a NiCd battery, a NiMH battery, and a Li battery, and an alternating current (AC) adapter. A recording medium interface (I/F) 18 is an interface with the recording medium 200, which is a memory card, a hard disk and the like. The recording medium 200 may be a memory card for recording captured image data. The recording medium 200 is configured from a semiconductor memory or a magnetic disk, for example.

The operation unit 70 includes, for example, a touch panel 71 that can detect a touch on the display unit 28. The touch panel 71 and the display unit 28 can be integrally configured. For example, the touch panel 71 is configured so that transmissivity thereof does not hinder the display of the display unit 28 and attached to an upper layer of a display surface of the display unit 28. Further, the input coordinates on the touch panel 71 are made to correspond to the display coordinates on the display unit 28. Accordingly, a graphical user interface (GUI) can be configured like as if a screen displayed on the display unit 28 can be directly operated by the user. The system control unit 50 can detect the following operations or states on the touch panel 71.

That the touch panel 71 is touched by a finger or a pen (hereinbelow, "Touch-Down").

That the touch panel 71 is being touched by a finger or a pen (hereinbelow, "Touch-On").

That a finger or a pen is moving while still in touch with the touch panel 71 (hereinbelow, "Touch-Move").

That the finger or the pen that was touching the touch panel 71 is released (hereinbelow, "Touch-Up").

That nothing is touching the touch panel 71 (hereinbelow, "Touch-Off").

The system control unit 50 is notified via an internal bus of these operations and states and the position coordinates where the finger or the pen is touching the touch panel 71. Then, the system control unit 50 determines what kind of operation is performed on the touch panel 71 based on the notified information. Regarding Touch-Move, a movement direction of a finger or a pen moving on the touch panel 71 can also be determined for each vertical component and horizontal component on the touch panel 71 based on changes in the position coordinates. When a Touch-Up is made following a predetermined Touch-Move after a Touch-Down performed on the touch panel 71, it is determined that a stroke has been drawn. An operation in which a stroke is rapidly drawn is referred to as a flick. A flick is an operation in which a finger is rapidly moved a certain distance while still touching the touch panel 71, and then released. In other words, a flick is an operation in which the finger rapidly traces over the touch panel 71 so as to bounce off it. When a Touch-Move is detected as having been performed for a predetermined distance or more at a predetermined speed or greater, and a Touch-Up is detected immediately thereafter, a flick is determined as having been performed. When a Touch-Move is detected as having been performed for a predetermined distance or more at less than a predetermined speed, a drag is determined as having been performed. Various touch panels can be used for the touch panel 71, including a resistance film type, a capacitance type, a surface acoustic wave type, an infrared ray type, an electromagnetic induction type, an image recognition type, a light sensor type and the like.

The operations performed in the above-described digital camera 100 will now be described.

In the digital camera 100, when the FUNC button included in the operation unit 70 is pressed during imaging standby in an imaging mode, a FUNC menu (a specific screen) is displayed by being superimposed over a through-the-lens image. The FUNC menu is configured from a plurality of higher-level menu items and a plurality of lower-level menu items respectively corresponding to the higher-level menu items. Although there is a plurality of menu items as higher-level menu items, not all of the menu items are displayed on one screen. Rather, one screen displays some of the menu items. In response to a scroll operation performed on the screen, the displayed menu items are changed, and all of the menu items can be displayed. Further, when a menu item arranged at the very end is selected from among the displayed menu items, and the user tries to scroll further on from the selected menu item, each menu item is scrolled by one item in the direction that lets the further on items be seen. Accordingly, the user can recognize that there are still more selectable items further on from the selected item.

Figure 3A:
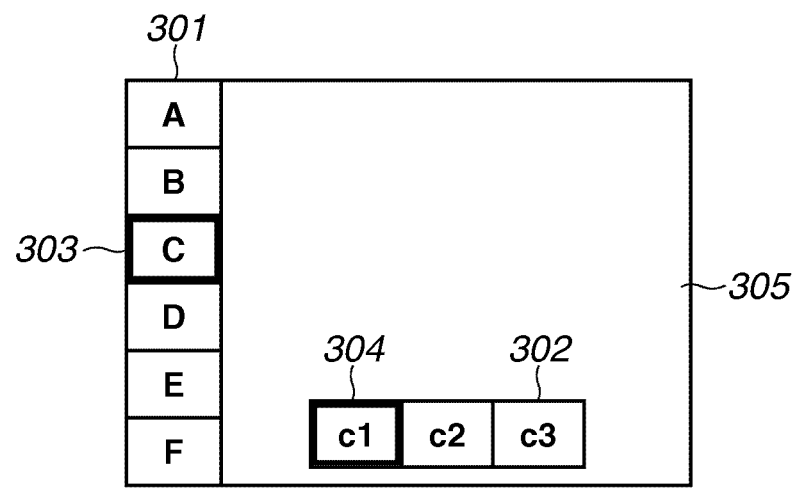
FIGS. 3A to 3C illustrate a screen related to a FUNC menu.

FIG. 3A illustrates a display example of a FUNC menu on the display unit 28 according to the present exemplary embodiment. The FUNC menu includes a higher-level menu item column which includes ten items A to J. Among these ten items, six items can be displayed at any one time. The other items can be displayed when an item group displayed on a higher-level menu 301 is scrolled. In FIG. 3A, the six higher-level menu items from A to F are displayed in the higher-level menu 301. A lower-level menu 302 displays a plurality of items that are lower-level menu items corresponding to the selected item in the higher-level menu 301.

Examples of higher-level menu items include exposure correction, white balance, and self-timer setting. Further, examples of lower-level menu items corresponding to the self-timer setting, which is a higher-level menu item, include a two second self-timer, a ten second self-timer, and a customized time self-timer. A cursor 303 indicates a menu item that is selected on the higher-level menu 301. A cursor 304 indicates a menu item that is selected on the lower-level menu 302. When a desired menu item is selected from the higher-level menu 301, the corresponding lower-level menu 302 is displayed. When a desired menu item is selected from the lower-level menu 302, the setting represented by the selected lower-level menu item (e.g., ten second self-timer) is set in the digital camera 100. A through-the-lens image 305 is displayed on the FUNC menu as a background.

Figure 3B:
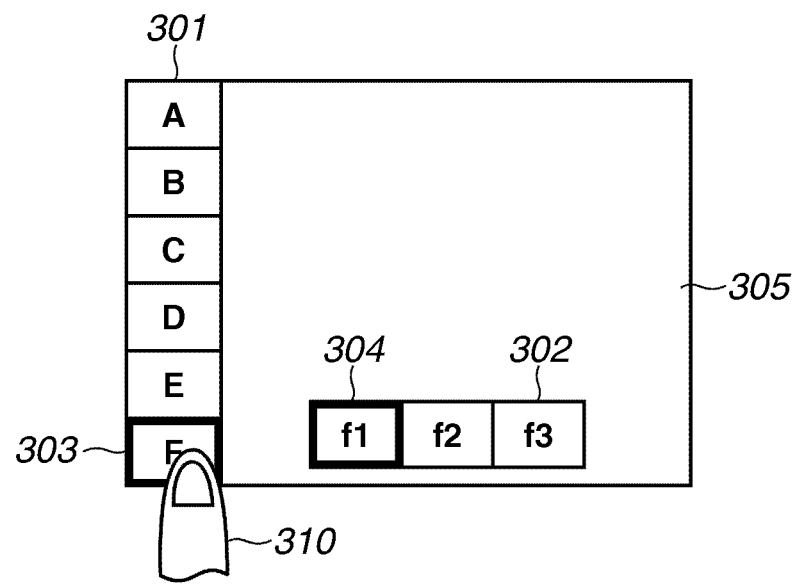

When one of the higher-level menu items displayed on the higher-level menu 301 is touched, the higher-level menu item at the touched position can be selected. FIG. 3B illustrates a display example when a Touch-Down has been made by a finger 310 on an item F among the higher-level menu items displayed on the higher-level menu 301. The item F at the position of the finger 310 that made the Touch-Down is selected, and the display of the lower-level menu 302 switches to the lower-level menu items (f1, f2, and f3) of the selected item F. More specifically, when a desired higher-level menu item is touched, the touched higher-level menu item is selected, and the function of the selected higher-level menu item (here, the function of displaying the corresponding lower-level menu items) is executed.

Figure 3C:
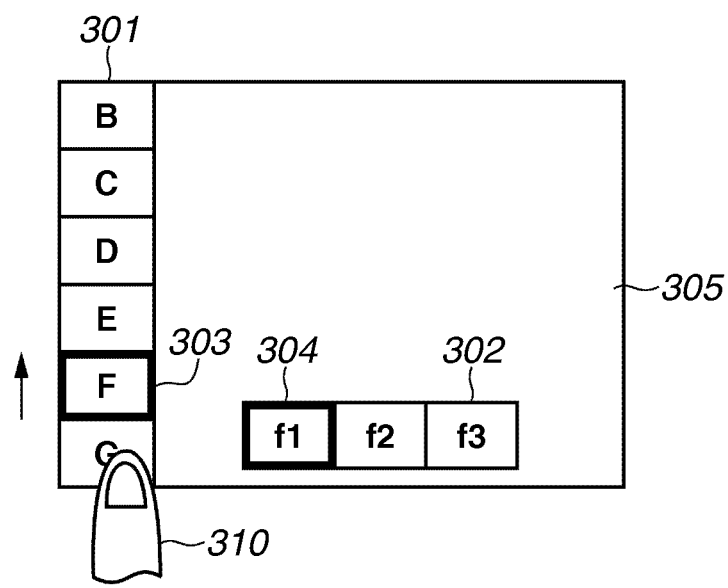

FIG. 3C illustrates a display example following on from FIG. 3B, in which the present disclosure is not applied. In FIG. 3B, among the displayed higher-level menu 301, the item F displayed at the end has been selected by a Touch-Down. The item F is not an end item among the items A to J which are all the items that can be displayed. In other words, when the item F is scrolled upwards, the items G to J can be displayed. Therefore, when the item F displayed at the end has been selected, like in FIG. 3B, the item group of the higher-level menu 301 is scrolled and moved in the direction to display the item G, which is further on from the item F. However, this means that scrolling occurs even if the user is in the midst of performing a Touch-On without moving his/her finger 310 from a Touch-Down position. Consequently, as illustrated in FIG. 3C, the position touched by the finger 310 and the position of the item F selected in the higher-level menu 301 deviate from each other. In such a case, the user may become confused that the item at the position touched by his/her finger is not correctly selected.

In response to this issue, FIG. 4 illustrates screen transitions in a case where the present disclosure is applied.

Figure 4A:
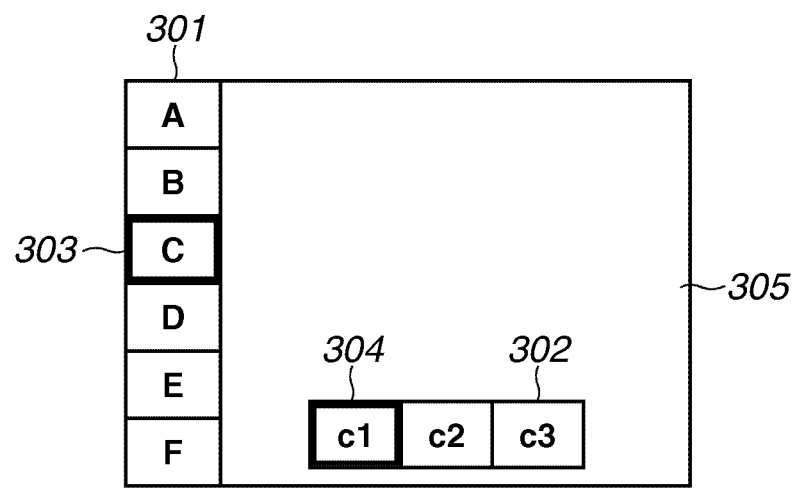
FIGS. 4A to 4C illustrate transition of display of a FUNC menu according to the exemplary embodiment.
Figure 4B:
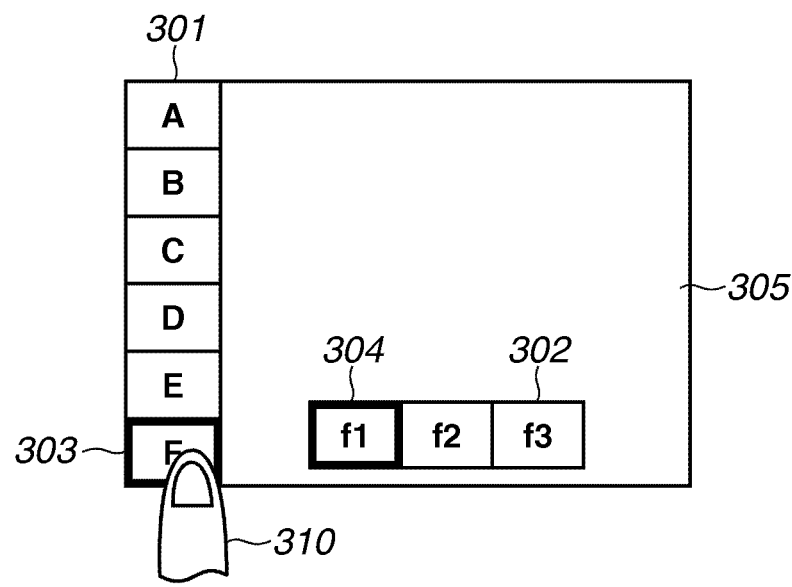

FIG. 4A is a display example of the FUNC menu which is the same as the one illustrated in FIG. 3A. On this screen a user makes a Touch-Down on the end item F displayed on the higher-level menu 301. A display example of this case is illustrated in FIG. 4B, which is also the same as what is illustrated in FIG. 3B. However, according to the present exemplary embodiment, when the item F is selected, the cursor 303 is placed on the item F, and if the lower-level menu items of the item F are displayed, scrolling is not performed until the finger 310 makes a Touch-Up. In other words, as long as the user continues to touch the item F as illustrated in FIG. 4B, the display state in FIG. 4B continues. Then, when the finger 310 makes a Touch-Up, scrolling is performed based on the Touch-Up in the direction for displaying the item G, which is further on from the item F.

Figure 4C:
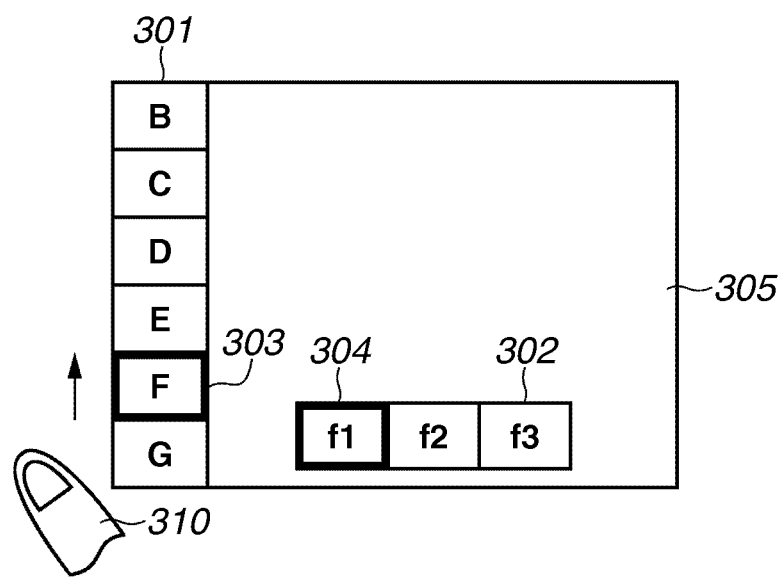

FIG. 4C illustrates a display example immediately after a Touch-Up has been made following the state in FIG. 4B. Based on this configuration, there is no deviation like that described with reference to FIG. 3C between the touched position and the selected position. Thus, the user can recognize that a target item has been correctly touched, so that confusion does not occur. In addition, based on the Touch-Up that was made, the display is scrolled in the direction for displaying the item G, which is further on from the item F and was not being displayed. Accordingly, the user can also recognize that there are still more selectable items further on from the item F.

Flowcharts of the processing for realizing the above-described operations will now be described.

Figure 5:
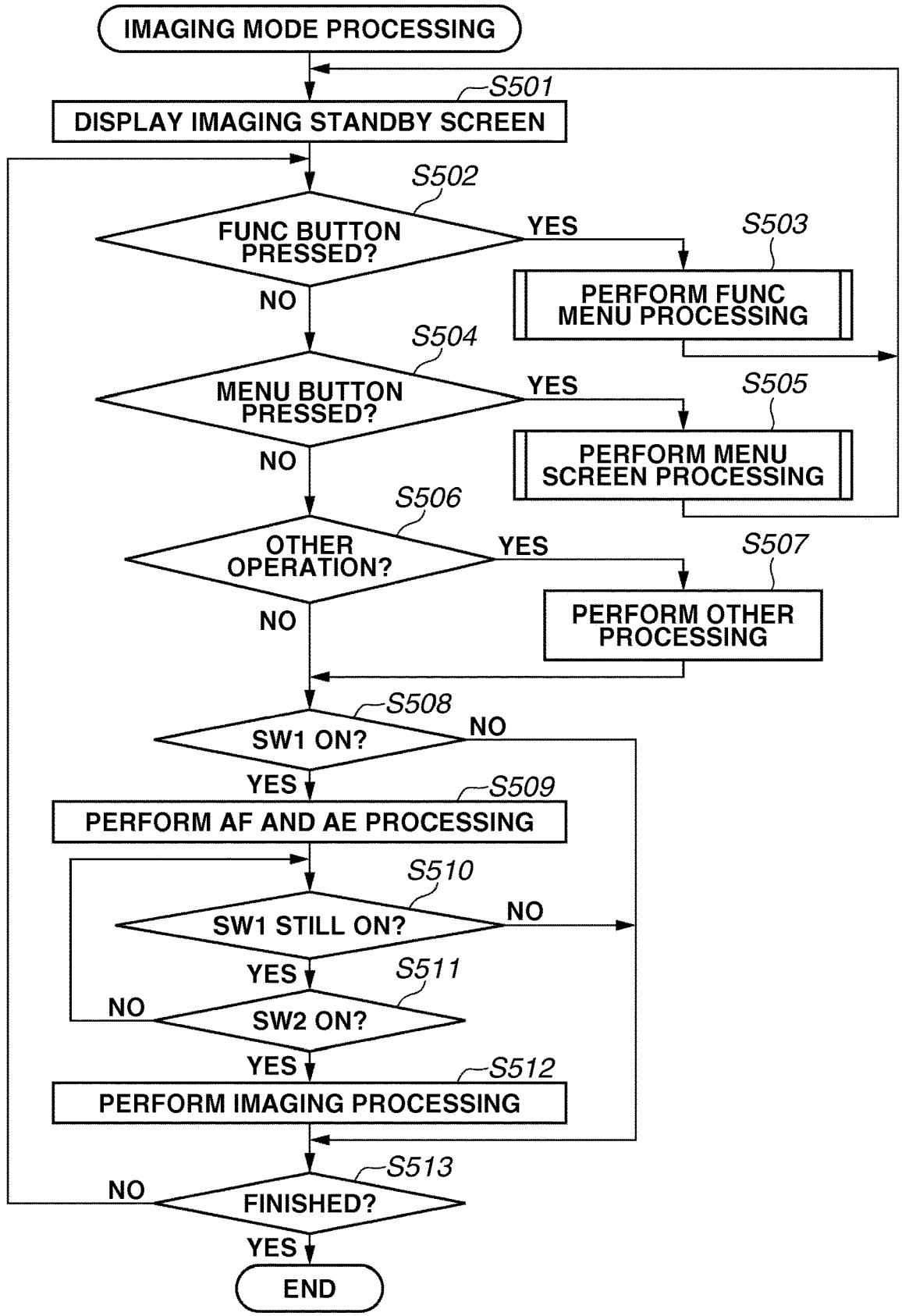
FIG. 5 is a flowchart illustrating imaging mode processing.

FIG. 5 illustrates a flowchart of imaging mode processing according to the present exemplary embodiment. The processing is realized by the system control unit 50 developing a program recorded in the non-volatile memory 56 in the system memory 52 and executing the program. The processing in FIG. 5 starts when the digital camera 100 is started up and set to the imaging mode.

In step S501, the system control unit 50 displays an imaging standby screen. On the imaging standby screen, a through-the-lens image is displayed on the display unit 28.

In step S502, the system control unit 50 determines whether the FUNC button included in the operation unit 70 has been pressed. If it is determined that the FUNC button has been pressed (YES in step S502), the processing proceeds to step S503. In step S503, the system control unit 50 performs FUNC menu processing. If it is determined that the FUNC button has not been pressed (NO in step S502), the processing proceeds to step S504. The FUNC menu processing performed in step S503 will be described in detail below with reference to FIG. 6.

In step S504, the system control unit 50 determines whether the menu button included in the operation unit 70 has been pressed. If it is determined that the menu button has been pressed (YES in step S504), the processing proceeds to step S505. In step S505, the system control unit 50 performs menu screen processing. If it is determined that the menu button has not been pressed (NO in step S504), the processing proceeds to step S506. The menu screen processing performed in step S505 will be described in detail below with reference to FIG. 8.

In step S506, the system control unit 50 determines whether some other operation has been performed. Examples of other operations include the pressing of a flash lamp button and the pressing of a macro button. If it is determined that some other operation has been performed (YES in step S506), the processing proceeds to step S507. In step S507, the system control unit 50 performs the processing corresponding to the selected operation. If it is determined that no other operations have been performed (NO in step S506), the processing proceeds to step S508.

In step S508, the system control unit 50 determines whether the first shutter switch signal SW1 is ON. If it is determined that the first shutter switch signal SW1 is ON (YES in step S508), then in step S509, the system control unit 50 performs imaging preparation processing, such as AF processing and AE processing. If it is determined that the first shutter switch signal SW1 is not ON (NO in step S508), the processing proceeds to step S513. In step S510, the system control unit 50 determines whether the first shutter switch signal SW1 is still ON. If it is determined that the first shutter switch signal SW1 is still ON (YES in step S510), the processing proceeds to step S511. If it is determined that the first shutter switch signal SW1 is turned OFF (NO in step S510), the processing proceeds to step S513. In step S511, the system control unit 50 determines whether the second shutter switch signal SW2 is ON. If it is determined that the second shutter switch signal SW2 is not ON (NO in step S511), the processing returns to step S510. If it is determined that the second shutter switch signal SW2 is ON (YES in step S511), the processing proceeds to step S512. In step S512, the system control unit 50 captures a still image with the imaging unit 22, and performs a series of imaging processes until the captured image is recorded as an image file in the recording medium 200.

In step S513, the system control unit 50 determines whether a finish event has occurred. Examples of a finish event include an operation for turning the power off and an operation for switching to the reproduction mode. If it is determined that there has been no finish event (NO in step S513), the processing returns to step S502, and the processing is repeated. If it is determined that there has been a finish event (YES in step S513), the imaging mode processing is finished.

Figure 6:
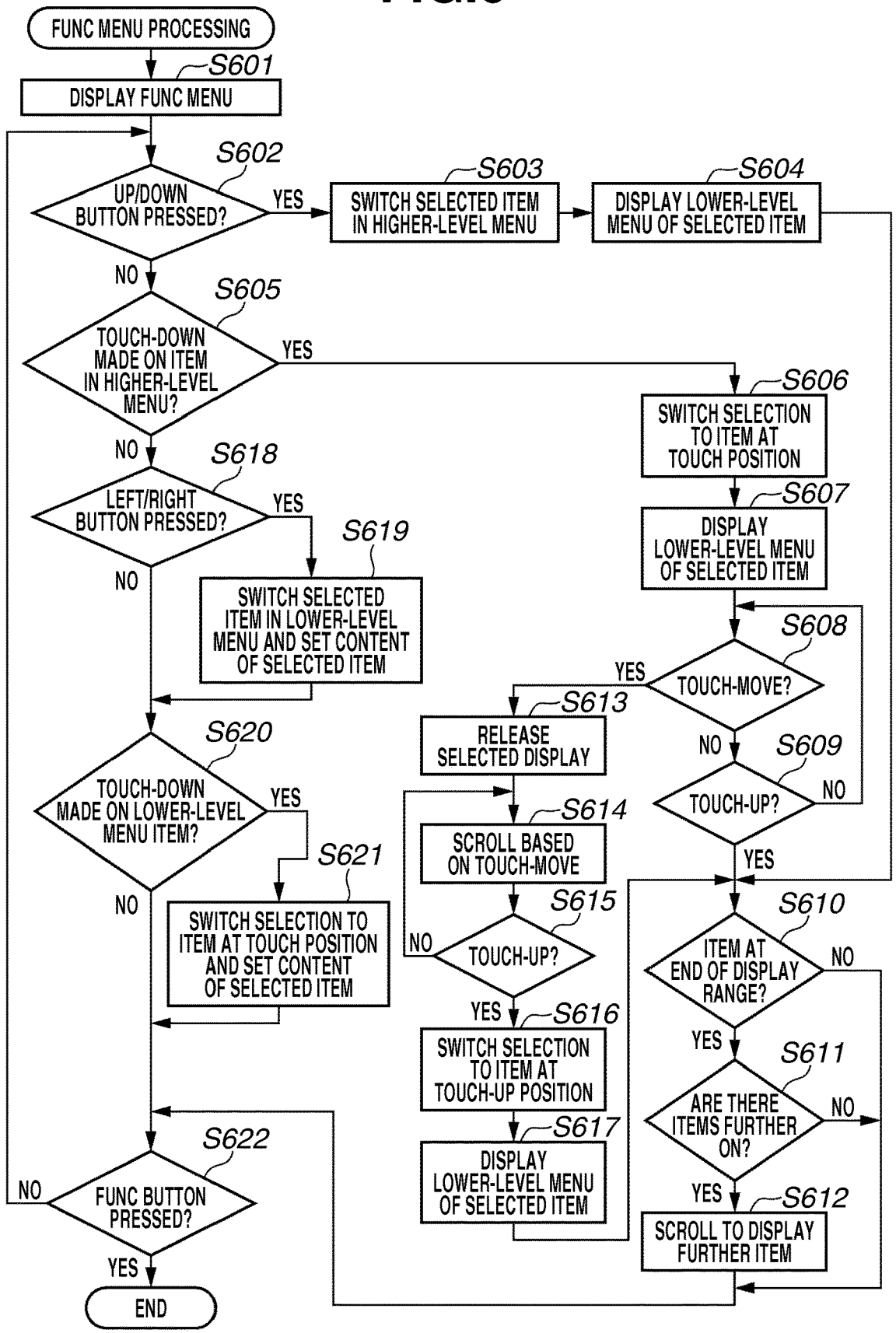
FIG. 6 is a flowchart illustrating FUNC menu processing.

FIG. 6 is a flowchart illustrating the details of the FUNC menu processing performed in step S503. The processing is realized by the system control unit 50 developing a program recorded in the non-volatile memory 56 in the system memory 52 and executing the program.

In step S601, the system control unit 50 displays the FUNC menu on the display unit 28. The FUNC menu is a display screen as illustrated in the above-described FIGS. 3A and 4A, and in FIG. 7A, for example. In the initial display, a state in which the item was last selected among the higher-level menu by the cursor 303 when the previous FUNC menu was displayed is displayed as selected item.

In step S602, the system control unit 50 determines whether the up/down button included in the operation unit 70 has been pressed. If it is determined that the up/down button has been pressed (YES in step S602), the processing proceeds to step S603, and if not (NO in step S602), the processing proceeds to step S605.

In step S603, the system control unit 50 switches the item selected in the higher-level menu based on whether the up button or the down button is pressed. More specifically, if the up button is pressed, the system control unit 50 selects a higher-level menu item displayed one above the higher-level menu item that had been selected. If the down button is pressed, the system control unit 50 selects a higher-level menu item displayed one below the higher-level menu item that had been selected.

In step S604, the system control unit 50 displays the lower-level menu items corresponding to the higher-level menu item selected in step S603. The selection switching of the higher-level menu performed in step S603 and the display of the lower-level menu items performed in step S604 are essentially performed simultaneously. Next, the processing proceeds to step S610. In step S610, the system control unit 50 determines whether to scroll the display according to the switching of the selection item in the higher-level menu performed in step S603. The processing performed in step S610 will be described below.

On the other hand, in step S605, the system control unit 50 determines whether a Touch-Down has been made at a position of one of the items in the higher-level menu displayed on the display unit 28. If it is determined that a Touch-Down has been made on one of the items in the higher-level menu (YES in step S605), the processing proceeds to step S606, and if not (NO in step S605), the processing proceeds to step S618.

In step S606, the system control unit 50 switches the selection of the higher-level menu item at the Touch-Down position, and displays the selected item with the cursor 303 placed thereon.

In step S607, the system control unit 50 displays the lower-level menu corresponding to the higher-level menu item of the Touch-Down position selected in step S606. More specifically, the higher-level menu item at the touch position when the Touch-Down was made is selected, and the function assigned to that selected item (display of the corresponding to lower-level menu) is executed. Consequently, the display is shifted from the state illustrated in FIG. 7A to the state illustrated in FIG. 7B or the state illustrated in FIG. 7C. Since the Touch-On operation is still being made in the display state illustrated in FIG. 7C, if the finger 310 is illustrated, the state would look like that illustrated in FIG. 4B.

In step S608, the system control unit 50 determines whether a Touch-Move has been made by the finger that performed the Touch-Down. If it is determined that a Touch-Move has been made (YES in step S608), the processing proceeds to step S613, and if not (NO in step S608), the processing proceeds to step S609.

In step S609, the system control unit 50 determines whether a Touch-Up has been made. If it is determined that a Touch-Up has been made (YES in step S609), the processing proceeds to step S610, and if not (NO in step S609), the processing returns to step S608.

In step S610, the system control unit 50 determines whether the newly selected higher-level menu item is an item displayed at an end (the upper end or the lower end) of the higher-level menu that was displayed before the selection of the higher-level menu item was switched. Examples of a newly selected higher-level menu item include the higher-level menu items selected in any of steps S603, S606, and S616. If it is determined that the newly selected item is an item displayed at an end (YES in step S610), the processing proceeds to step S611, and if not (NO in step S610), the processing proceeds to step S622.

In step S611, the system control unit 50 determines whether there are any higher-level menu items that are not displayed further on from the end at which the newly selected item is positioned (in the direction beyond the end and not displayed). In other words, the system control unit 50 determines whether there are any higher-level menu items that can be newly displayed if the newly selected higher-level menu item is scrolled toward the opposite side to the end where that item is positioned. To state in yet another way, the system control unit 50 determines whether the order of the display position of the newly selected higher-level menu item is an end (is the head or the tail) in the higher-level menu item column formed from all the higher-level menu items that can be displayed in the higher-level menu (items A to J).

More specifically, the system control unit 50 determines whether the newly selected higher-level menu item is the item A or the item J. If it is determined that the newly selected higher-level menu item is neither the item A nor the item J, this means that there are higher-level menu items that are not displayed further on from the end where the newly selected higher-level menu item is positioned. If it is determined that there are higher-level menu items that are not displayed further on from the newly selected higher-level menu item (when the newly selected higher-level menu item is not the item A or the item J) (YES in step S611), the processing proceeds to step S612, and if not (NO in step S611), the processing proceeds to step S622.

If it is determined that the newly selected higher-level menu item is the item A or the item J, scrolling is not performed because there are no more items to be displayed if the display is scrolled further. Therefore, when the item A or the item J has been selected, the display looks like the state in the display examples illustrated in FIG. 7A or 7F, in which even for the Touch-Off state the selected higher-level menu item is positioned at the end of the higher-level menu. In other words, the display changes from the state in the display example in FIG. 7E to that in FIG. 7F without scrolling if the selection in the higher-level menu is switched to one below.

In step S612, the system control unit 50 scrolls the higher-level menu item by one item in the direction for displaying the higher-level menu items which are not displayed and further on from the end where the newly selected higher-level menu item is positioned. Consequently, if the newly selected higher-level menu item is selected in step S606 by the Touch-Down, the display is scrolled so that the display state changes from that illustrated in FIG. 7C before the Touch-Up was made to the display state in FIG. 7D. If the newly selected higher-level menu item is selected in step S603 by the pressing of the down button, the display is scrolled so that the display state changes from that illustrated in FIG. 7B before the selection change (before the pressing of the down button) to the display state illustrated in FIG. 7D.

On the other hand, in step S613, since the system control unit 50 detected the Touch-Move based on the touch operation on the higher-level menu item, the system control unit 50 releases the selection of the higher-level menu item, and changes the display to a state in which no higher-level menu item is selected. At that time, the cursor 303 is not displayed on any of the items.

In step S614, the system control unit 50 scrolls the group of higher-level menu items that is displayed on the higher-level menu 301 based on the Touch-Move operation. Thus, the user can display arbitrary six items among the higher-level menu items A to J.

In step S615, the system control unit 50 determines whether a Touch-Up has been made. If it is determined that a Touch-Up has been made (YES in step S615), the processing proceeds to step S616. If it is determined that a Touch-Up has not been made (NO in step S615), the processing returns to step S614, and the system control unit 50 continuously performs scrolling based on the Touch-Move.

In step S616, the system control unit 50 selects the higher-level menu item displayed at the Touch-Up position (the touch position immediately before touch is released), and display the selected item with the cursor 303 placed thereon.

In step S617, the system control unit 50 displays on the display unit 28 the lower-level menu corresponding to the higher-level menu item at the Touch-Up position selected in step S616. Steps S616 and S617 are essentially performed simultaneously. When the higher-level menu item of the Touch-Up position is selected, the processing proceeds to step S610. As described above, in step S610, the system control unit 50 determines whether the higher-level menu item at the newly selected Touch-Up position is an item that needs scrolling in order to display the items further on. If the higher-level menu item at the newly selected Touch-Up position is positioned at the end, and if there are higher-level menu items that are not displayed further on from that end (YES in steps S610 and S611), then in step S612, the system control unit 50 performs scrolling, and if not (NO in step S610 or S611), the processing proceeds to step S622.

On the other hand, in step S618, the system control unit 50 determines whether a left/right button included in the operation unit 70 has been pressed. If it is determined that a left/right button has been pressed (YES in step S618), the processing proceeds to step S619, and if not (NO in step S618) the processing proceeds to step S620.

In step S619, the system control unit 50 switches the item selected in the lower-level menu according to the pressing of the left/right button. More specifically, if the left button is pressed, the lower-level menu cursor 304 is moved one item to the left, and if the right button is pressed, the lower-level menu cursor 304 is moved one item to the right. The system control unit 50 then sets the content of the newly selected lower-level menu item in the digital camera 100 (e.g., if two second self-timer is selected, sets the two second self-timer).

In step S620, the system control unit 50 determines whether a Touch-Down has been made on any of the plurality of lower-level menu items displayed in the lower-level menu. If a Touch-Down has been made on any of the lower-level menu items (YES in step S620), the processing proceeds to step S621, and if not (NO in step S620), the processing proceeds to step S622.

In step S621, the system control unit 50 switches the selection in the lower-level menu to a lower-level menu item at the position where the Touch-Down was made. Then, the system control unit 50 sets the content of the newly selected lower-level menu item in the digital camera 100.

In step S622, the system control unit 50 determines whether the FUNC button included in the operation unit 70 has been pressed. If it is determined that the FUNC button has not been pressed (NO in step S622), the processing returns to step S602, and repeats the processing. If it is determined that the FUNC button has been pressed (YES in step S622), the system control unit 50 closes the FUNC menu (the FUNC menu is set so that it is not displayed), and finishes the FUNC menu processing. The processing then proceeds to step S501 in FIG. 5.

According to the above-described FUNC menu processing, if an item is selected that is at the end of the displayed higher-level menu, and further on from which scrolling can be performed, the following different actions occur based on what the selected operation was. If the top/down button is pressed, selection of the higher-level menu item (step S603), execution of the function of the selected item (step S604), and scrolling for displaying further on items (step S612) occur essentially simultaneously. Similarly, when a higher-level menu item is selected by a Touch-Up after a Touch-Move, selection of the higher-level menu item (step S616), execution of the function of the selected item (step S617), and scrolling for displaying further on items (step S612) occur essentially simultaneously. However, if the item is selected by a Touch-Down, scrolling for displaying further on items (step S612) is not performed immediately after selection in the higher-level menu (step S606) and execution of the function of the selected item (step S607) are performed, and the scrolling is performed after waiting for a Touch-Up.

In the above-described processing, the processing that is according to the pressing of the up/down button, which is a mechanical pressing button included in the operation unit 70, can also be performed based on touch on up/down button icons that are displayed on the display unit 28 and that can be operated by touching the touch panel 71. For example, an up button icon and a down button icon may be displayed on the FUNC menu, and a "YES" determination is made in step S605 if either of the button icons is touched.

Figure 8:
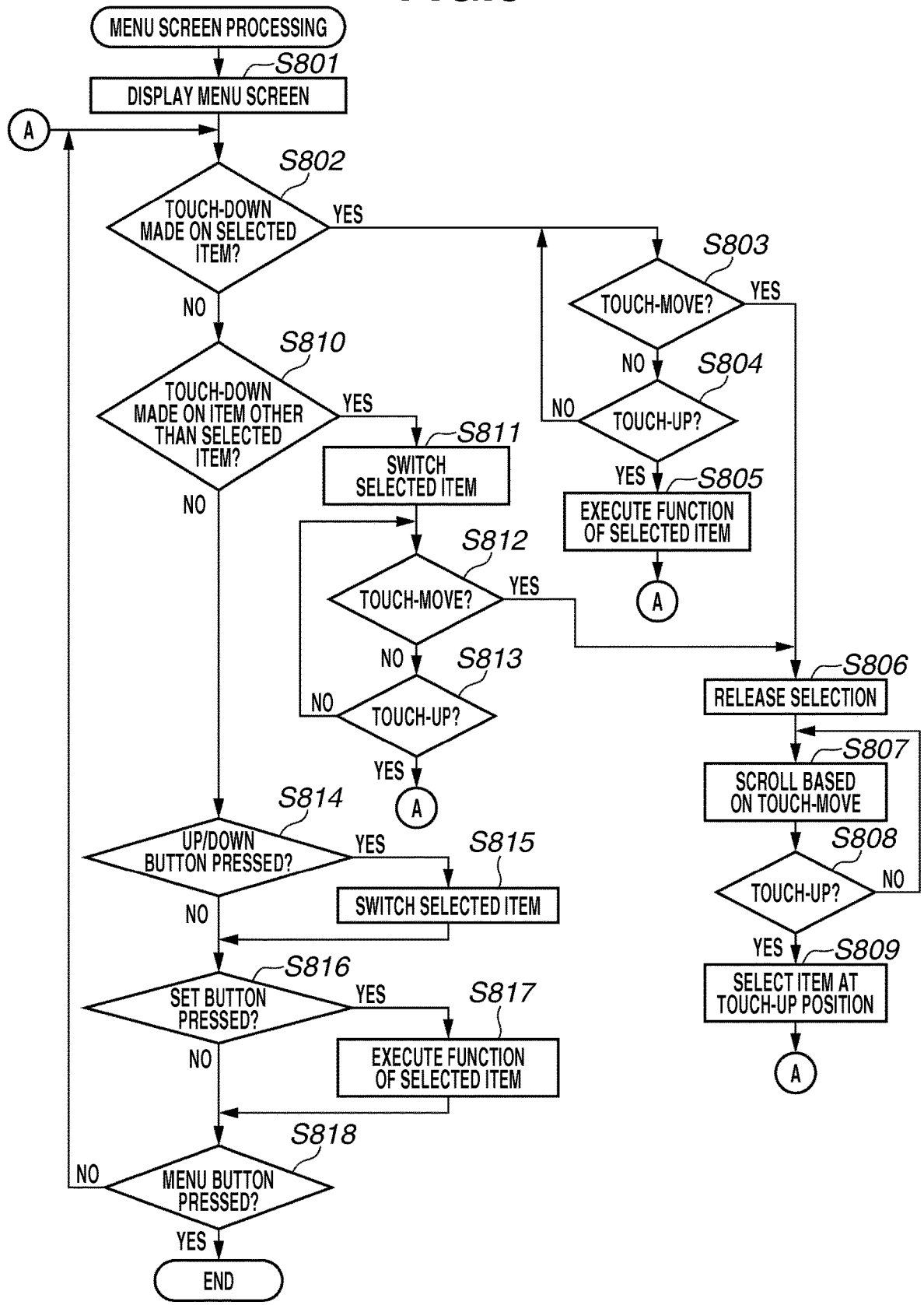
FIG. 8 is a flowchart illustrating menu screen processing.

FIG. 8 is a flowchart illustrating details of the menu screen processing which is performed in step S505 in FIG. 5. The processing is realized by the system control unit 50 developing a program recorded in the non-volatile memory 56 in the system memory 52 and executing the program.

Figure 9:
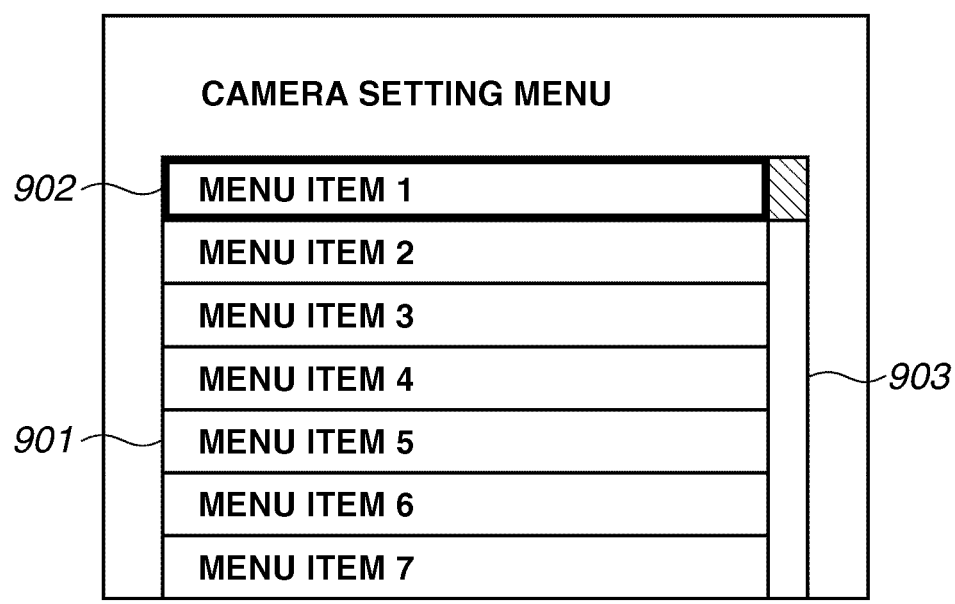
FIG. 9 is a display example of a menu screen.

In step S801, the system control unit 50 displays a menu screen (another screen) on the display unit 28. FIG. 9 illustrates a display example of the menu screen. A plurality of menu items is displayed in a menu display area 901 on the menu screen. A selected menu item is displayed on which a cursor 902 is placed among the plurality of menu items. In the menu display area 901, all of the selectable menu items are not displayed simultaneously, and seven items which are a part of all the selectable menu items are displayed. In addition, other non-displayed menu items can also be displayed according to a scroll operation.

A scroll bar 903 indicates a position of an item group currently displayed in the menu display area 901 among all the menu items. By looking at the scroll bar 903, a user can recognize that scrolling is possible, and about how far and in which direction scrolling can be performed. For example, in the example illustrated in FIG. 9, since there are no selectable menu items above a menu item 1, the user can see that scrolling for displaying the upper side is not possible. Further, since there are selectable menu items below a menu item 7, the user can see that scrolling for displaying the menu items that are below the menu item 7 is possible.

In step S802, the system control unit 50 determines whether a Touch-Down has been made on the selected menu item (the menu item on which the cursor 902 is placed). If it is determined that a Touch-Down has been made on the selected menu item (YES in step S802), the processing proceeds to step S803, and if not (NO in step S802), the processing proceeds to step S810.

In step S803, the system control unit 50 determines whether a Touch-Move has been made at the touch position where the Touch-Down was made in step S802. If it is determined that a Touch-Move has been made (YES in step S803), the processing proceeds to step S806, and if not (NO in step S803), the processing proceeds to step S804.

In step S804, the system control unit 50 determines whether a Touch-Up has been made. If it is determined that a Touch-Up has been made (YES in step S804), the processing proceeds to step S805, and if not (NO in step S804), the processing returns to step S803, and waits for a Touch-Move or a Touch-Up to be made.

In step S805, the system control unit 50 executes the function of the selected menu item. For example, the system control unit 50 switches the digital zoom on/off.

On the other hand, in step S806, since the Touch-Move was detected based on the touch operation on the menu item, the system control unit 50 releases the selection of the menu item, and changes the display to a state in which no menu item is selected. At that time, the cursor 902 is not displayed on any of the items.

In step S807, the system control unit 50 scrolls the group of menu items that is displayed in the menu display area 901 according to the Touch-Move operation. Consequently, the user can display arbitrary seven items from among all of the selectable menu items.

In step S808, the system control unit 50 determines whether a Touch-Up has been made. If it is determined that a Touch-Up has been made (YES in step S808), the processing proceeds to step S809, and if not (NO in step S808), the processing returns to step S807, and the system control unit 50 continuously performs scrolling based the Touch-Move.

In step S809, the system control unit 50 selects the menu item displayed at the coordinate position where the Touch-Up was made, and places the cursor 902. This processing only switches the selection of the menu item, and the function of the selected menu item is not executed (e.g., changing the digital zoom on/off setting).

On the other hand, in step S810, the system control unit 50 determines whether a Touch-Down has been made on a menu item other than the selected menu item among the menu items displayed in the menu display area 901. If it is determined that a Touch-Down has been made on a non-selected menu item (YES in step S810), the processing proceeds to step S811, and if not (NO in step S810), the processing proceeds to step S814.

In step S811, the system control unit 50 switches selection to the menu item at the position where the Touch-Down was made. In other words, the system control unit 50 moves the cursor 902 to the menu item at the position where the Touch-Down was made. This processing only switches the menu item to be selected, and the function of the selected menu item is not executed (e.g., changing the digital zoom on/off setting).

In step S812, the system control unit 50 determines whether a Touch-Move has been made at the touch position where the Touch-Down was made in step S810. If it is determined that a Touch-Move has been made (YES in step S812), the processing proceeds to step S806, and if not (NO in step S812), the processing proceeds to step S813.

In step S813, the system control unit 50 determines whether a Touch-Up has been made. If it is determined that a Touch-Up has been made (YES in step S813), the processing proceeds to step S802, and if not (NO in step S813), the processing returns to step S812, and waits for a Touch-Move or a Touch-Up to be made.

In step S814, the system control unit 50 determines whether the up/down button included in the operation unit 70 has been pressed. If it is determined that the up/down button has been pressed (YES in step S814), the processing proceeds to step S815, and if not (NO in step S814), the processing proceeds to step S816.

In step S815, the system control unit 50 switches the selected menu item among the menu items displayed in the menu display area 901 according to the pressing of the up/down button. For example, if the down button is pressed once when the menu item 1 is selected as in FIG. 9, the selected menu item changes to a menu item 2, and the cursor 902 is moved from the menu item 1 to the menu item 2.

If the down button is pressed in a state in which an item displayed at the end is selected from among the displayed menu items, and there are non-displayed selectable menu items further below, the display is scrolled in the direction for displaying the non-displayed selectable menu items. For example, if the down button is pressed once in a state in which the menu items 1 to 7 are displayed in the menu display area 901 and the menu item 7 is selected, scrolling is performed by one item so that the menu items 2 to 8 are displayed. Then, the menu item 8 that is displayed at the end of the menu display area 901 is selected and displayed.

In step S816, the system control unit 50 determines whether the SET button included in the operation unit 70 has been pressed. If it is determined that the SET button has been pressed (YES in step S816), the processing proceeds to step S817, and if not (NO in step S816), the processing proceeds to step S818.

In step S817, the system control unit 50 executes the function assigned to the currently selected menu item (the menu item where the cursor 902 is placed). For example, the system control unit 50 changes the digital zoom on/off setting.

In step S818, the system control unit 50 determines whether the menu button included in the operation unit 70 has been pressed. If it is determined that the menu button has not been pressed (NO in step S818), the processing returns to step S802, and repeats the processing. If it is determined that the menu button has been pressed (YES in step S818), the system control unit 50 closes the menu screen, and finishes the menu screen processing. The processing then proceeds to step S501 in FIG. 5.

On the above-described menu screen, to execute the function of a desired menu item by a touch operation, the user has to select the menu item by touching it once, and then touch the same menu item once more. Therefore, to execute the function of the desired menu item quickly, the user has to touch the desired menu item twice quickly in succession.

At this point, if scrolling is performed because the selected item is at the end and there are items that are not displayed further on, like the FUNC menu described with reference to FIG. 6, the desired menu item cannot be touched twice in succession even if the same position is touched twice in succession. This is because the position of the desired item is changed by the first touch.

Therefore, if an item function is executed by touching a non-selected item once to select it, and then touching the same item once more in the selected state, like the menu screen described with reference to FIG. 8, scrolling accompanied by the selection of an item at a screen end is not performed.

The control performed by the above-described system control unit 50 may be performed by one piece of hardware, or the entire apparatus may be controlled by a plurality of pieces of hardware dividing the processing among the pieces of hardware.

Further, according to the above-described exemplary embodiment, although a case is described in which the present disclosure is applied to a digital camera, the present disclosure is not limited to this example. For example, the present disclosure can be applied to any apparatus, as long as the apparatus is capable of displaying all or a part of a plurality of selectable items on a screen, and selecting an item from among the plurality of items by a touch operation. More specifically, the present disclosure can be applied to apparatuses such as a personal computer, a personal digital assistant (PDA), a mobile phone terminal, a portable image viewer, a printer apparatus including a display, a digital photo frame, a music player, a game console, an electronic book reader, a tablet terminal, and the like.

Aspects of the present disclosure can also be realized by a computer of a system or apparatus (or devices such as a CPU, a micro processing unit (MPU), or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A display control apparatus comprising:
   a memory and at least one processor configured to function as:
   a display control unit configured to perform display control to display a first group of items on a display screen, wherein the first group of items is formed from some of a plurality of items ordered in an item line from a first item to a last item, wherein a plurality of functions is respectively assigned to the plurality of items,
   a detection unit configured to detect a touch operation on an item in the first group of items displayed on the display screen, and
   a control unit configured to perform control,
   wherein, in a case where a touch on an item at a first position is detected by the detection unit and the touched item is a fully-displayed item, the control unit performs control not to move the first group of items based on the touch on the fully-displayed item,
   wherein, in a case where the touch on an item and releasing of the touch from the touched fully-displayed item at the first position is detected and the touched fully-displayed item is positioned at an end on one side of the first group of items displayed on the display screen and is neither the first item nor the last item in the item line, the control unit performs control to move the first group of items so that the touched fully-displayed item, from which the releasing of the touch is detected, is moved from the first position to a second position so that an item which was not displayed before the movement is displayed,
   wherein, in a case where the touch on an item and releasing of the touch from the touched fully-displayed item at the first position is detected and the touched fully-displayed item is either the first item or the last item in the item line, the control unit performs control not to move the first group of items such that the touched fully-displayed item, from which the releasing of the touch is detected, is not moved from the first position to the second position, and
   wherein the control unit performs control to display a second group of items which corresponds to the touched item and represents lower-level items of the touched item in response to the touch operation to the touched item, and not to move a display position of the second group of items in a case where a touch on and releasing of the touch from the item in the second group of items is detected and the touched item of the second group is selected by the touch on the touched item in the second group.

2. The display control apparatus according to claim 1, wherein the control unit is configured to perform control not to display a scroll bar with the first group of items.

3. The display control apparatus according to claim 1, wherein the control unit is configured to perform control to display the touched item of the second group in a selected state in response to the touching on the item of the second group.

4. The display control apparatus according to claim 1, wherein the control unit is configured to perform control to display the second group of items along a line perpendicular to a line of the first group of items.

5. The display apparatus according to claim 1, wherein the control unit performs control to display the second group of items in a predetermined display position in response to the touch operation to the touched item of the first group, regardless of a position of the touched item of the first group.

6. A method for controlling a display control apparatus, the method comprising:
  performing control to display a first group of items on a display screen, wherein the first group of items is formed from some of a plurality of items ordered in an item line from a first item to a last item, wherein a plurality of functions is respectively assigned to the plurality of items;
  detecting a touch operation on an item in the first group of items displayed on the display screen; and
  performing control,
  wherein, in a case where a touch on an item at a first position is detected and the touched item is a fully-displayed item, performing control includes performing control not to move the first group of items based on the touch on the fully-displayed item,
  wherein, in a case where the touch on an item and releasing of the touch from the touched fully-displayed item at the first position is detected and the touched fully-displayed item is positioned at an end on one side of the first group of items displayed on the display screen and is neither the first item nor the last item in the item line, performing control includes performing control to move the first group of items so that the touched fully-displayed item, from which the releasing of the touch is detected, is moved from the first position to a second position so that an item which was not displayed before the movement is displayed,
  wherein, in a case where the touch on an item and releasing of the touch from the touched fully-displayed item at the first position is detected and the touched fully-displayed item is either the first item or the last item in the item line, performing control includes performing control not to move the first group of items such that the touched fully-displayed item, from which the releasing of the touch is detected, is not moved from the first position to the second position, and
  wherein performing control includes performing control to display a second group of items which corresponds to the touched item and represents lower-level items of the touched item in response to the touch operation to the touched item, and not to move a display position of the second group of items in a case where a touch on and releasing of the touch from the item in the second group of items is detected and the touched item of the second group is selected by the touch on the touched item in the second group.

7. A non-transitory computer-readable recording medium that stores a program which causes a computer to execute a method for controlling a display control apparatus, the method comprising:
  performing control to display a first group of items on a display screen, wherein the first group of items is formed from some of a plurality of items ordered in an item line from a first item to a last item, wherein a plurality of functions is respectively assigned to the plurality of items;
  detecting a touch operation on an item in the first group of items displayed on the display screen; and
  performing control,
  wherein, in a case where a touch on an item at a first position is detected and the touched item is a fully-displayed item, performing control includes performing control not to move the first group of items based on the touch on the fully-displayed item,
  wherein, in a case where the touch on an item and releasing of the touch from the touched fully-displayed item at the first position is detected and the touched fully-displayed item is positioned at an end on one side of the first group of items displayed on the display screen and is neither the first item nor the last item in the item line, performing control includes performing control to move the first group of items so that the touched fully-displayed item, from which the releasing of the touch is detected, is moved from the first position to a second position so that an item which was not displayed before the movement is displayed,
  wherein, in a case where the touch on an item and releasing of the touch from the touched fully-displayed item at the first position is detected and the touched fully-displayed item is either the first item or the last item in the item line, performing control includes performing control not to move the first group of items such that the touched fully-displayed item, from which the releasing of the touch is detected, is not moved from the first position to the second position, and
  wherein performing control includes performing control to display a second group of items which corresponds to the touched item and represents lower-level items of the touched item in response to the touch operation to the touched item, and not to move a display position of the second group of items in a case where a touch on and releasing of the touch from the item in the second group of items is detected and the touched item of the second group is selected by the touch on the touched item in the second group.

* * * * *